US009677645B2

(12) United States Patent
Ike et al.

(10) Patent No.: US 9,677,645 B2
(45) Date of Patent: Jun. 13, 2017

(54) POWER TRANSMISSION SYSTEM (71) Applicant: AISIN AW CO., LTD., Anjo-shi, Aichi-ken (JP)

(72) Inventors: Nobukazu Ike, Kariya (JP); Masashi Kito, Anjo (JP); Akira Noguchi, Anjo (JP); Yuichi Seki, Okazaki (JP); Osamu Murai, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/115,002

(22) PCT Filed: Feb. 18, 2015

(86) PCT No.: PCT/JP2015/054400
§ 371 (c)(1),
(2) Date: Jul. 28, 2016

(87) PCT Pub. No.: WO2015/133272
PCT Pub. Date: Sep. 11, 2015

(65) Prior Publication Data
US 2016/0341288 A1 Nov. 24, 2016

(30) Foreign Application Priority Data

Mar. 6, 2014 (JP) .................................. 2014-044148

(51) Int. Cl.
*F16H 3/66* (2006.01)
*F16H 57/04* (2010.01)
*F16H 57/021* (2012.01)

(52) U.S. Cl.
CPC ............ *F16H 3/663* (2013.01); *F16H 3/666* (2013.01); *F16H 57/021* (2013.01);
(Continued)

(58) Field of Classification Search
None
See application file for complete search history.

(56) References Cited

U.S. PATENT DOCUMENTS 6,165,097 A * 12/2000 Hebbale ............... F16H 3/666
475/280
9,429,226 B2 * 8/2016 Ike ........................ F16H 57/082
(Continued)

FOREIGN PATENT DOCUMENTS

JP    2001-221300 A    8/2001
JP    2001-254806 A    9/2001
(Continued)

OTHER PUBLICATIONS

Apr. 21, 2015 International Search Report issued in International Patent Application No. PCT/JP2015/054400.

*Primary Examiner* — Colby M Hansen
(74) *Attorney, Agent, or Firm* — Oliff PLC (57) ABSTRACT

A power transmission system that includes a torque converter; a transmission having a planetary gear; a case configured to accommodate the torque converter and the transmission; a support having a wall that is fixed to the case between the torque converter and the transmission and a tube that extends in an axial direction from an inner circumferential portion of the wall; a stator shaft that is connected to a stator of the torque converter via a one-way clutch; and a tubular connector that connects the support and a stationary element of the planetary gear together.

6 Claims, 4 Drawing Sheets

(52) U.S. Cl.
CPC ... *F16H 57/0424* (2013.01); *F16H 2200/006* (2013.01); *F16H 2200/0086* (2013.01); *F16H 2200/2007* (2013.01); *F16H 2200/2023* (2013.01); *F16H 2200/2046* (2013.01); *F16H 2200/2066* (2013.01); *F16H 2200/2082* (2013.01)

(56) References Cited

U.S. PATENT DOCUMENTS

| | | | |
|---|---|---|---|
| 2006/0025276 A1* | 2/2006 | Shim | F16H 3/663 475/284 |
| 2006/0035744 A1* | 2/2006 | Seo | F16H 3/663 475/284 |
| 2006/0068965 A1* | 3/2006 | Gumpoltsberger | F16H 3/663 475/275 |
| 2009/0023529 A1* | 1/2009 | Sanji | B60K 6/365 475/5 |
| 2009/0203479 A1 | 8/2009 | Krause et al. | |

FOREIGN PATENT DOCUMENTS

| | | |
|---|---|---|
| JP | 2005-061444 A | 3/2005 |
| JP | 2008-082467 A | 4/2008 |

\* cited by examiner

|  |  | C-1 | C-2 | C-3 | C-4 | B-1 | B-2 | F-1 |
|---|---|---|---|---|---|---|---|---|
| D | 1st | ○ |  |  |  |  | ● | ○ |
|  | 2nd | ○ |  |  |  | ○ |  |  |
|  | 3rd | ○ |  | ○ |  |  |  |  |
|  | 4th | ○ |  |  | ○ |  |  |  |
|  | 5th | ○ | ○ |  |  |  |  |  |
|  | 6th |  | ○ |  | ○ |  |  |  |
|  | 7th |  | ○ | ○ |  |  |  |  |
|  | 8th |  | ○ |  |  | ○ |  |  |
| REV1 |  |  |  | ○ |  |  | ○ |  |
| REV2 |  |  |  |  | ○ |  | ○ |  |

※○: ENGAGED
●: ENGAGED WHEN ENGINE BRAKING IS IN OPERATION.

POWER TRANSMISSION SYSTEM

BACKGROUND

The present disclosure relates to a power transmission system that includes a torque converter, a transmission that has a planetary gear and a case that accommodates the torque converter and the transmission.

As a power transmission system of this type, there is conventionally known a power transmission system that has a pump cover making up a bulkhead of a transmission case and a stator shaft connected to a stator of a torque converter via a one-way clutch (for example, refer to JP-A-2001-221300). In this power transmission system, the stator shaft is inserted into a projecting tubular portion that extends towards the transmission from the pump cover to be fixed in place in the projecting tubular portion through serrations and press fitting, and a sun gear of a planetary gear that makes up the transmission is spline connected to an end portion of the stator shaft that lies opposite to an end portion where the stator shaft is connected to the stator. By doing so, the stator shaft and the sun gear, which is a stationary element of the planetary gear, are connected (fixed) to the transmission case via the pump cover so as not to rotate.

SUMMARY

In the conventional power transmission system, however, both the stator shaft and the sun gear of the planetary gear are fixed to the transmission case so as not to rotate by the one serration fitting portion configured by the serrations that are formed on the projecting tubular portion of the pump cover and the stator shaft, and therefore, the load is concentrated to the one serration fitting portion. Owing to this, in the conventional power transmission system, it is necessary to extend the axial length of the serration fitting portion and increase the diameter of the projecting tubular portion or the stator shaft to increase the so-called torque radius. Further, the load from both the stator shaft and the sun gear of the planetary gear is exerted on the stator shaft, hence the thickness of the stator shaft has to be increased to ensure the strength thereof. Consequently, in the conventional power transmission system, it becomes difficult to make the whole of the power transmission system compact in size while fixing the stator shaft and the sun gear of the planetary gear so as not to rotate.

An exemplary aspect of the present disclosure provides a power transmission system an overall size of which can be made compact while fixing well a stator shaft of a torque converter and a stationary element of a planetary gear that are included in the power transmission system so as not to rotate.

A power transmission system according to the present disclosure includes a torque converter; a transmission having a planetary gear; a case configured to accommodate the torque converter and the transmission; a support having a wall that is fixed to the case between the torque converter and the transmission and a tube that extends in an axial direction from an inner circumferential portion of the wall; a stator shaft that is connected to a stator of the torque converter via a one-way clutch; and a tubular connector that connects the support and a stationary element of the planetary gear together, wherein the stator shaft is connected to an end portion, lying to face the torque converter, of the tube of the support via a first rotation preventive fitting so as not to rotate, and the connector is connected to an end portion, lying to face the transmission, of the tube of the support via a second rotation preventive fitting so as not to rotate.

This power transmission system includes the support having the wall that is fixed to the case between the torque converter and the transmission and the first tubular portion that extends in the axial direction from the wall towards the torque converter and the second tubular portion that extends in the axial direction from the wall towards the transmission. The stator shaft is connected to the stator of the torque converter via the one-way clutch, and the support and the stationary element of the planetary gear are connected to each other via the tubular connector. The stator shaft is connected to the first tubular portion of the support via the first rotation preventive fitting so as not to rotate, and the connector is connected to the second tubular portion of the support via the second rotation preventive fitting portion so as not to rotate. In this way, the rotation preventive fittings are provided individually for both the stator shaft and the stationary element of the planetary gear so that the stator shaft and the stationary element of the planetary gear are fixed to the case so as not to rotate via the support, whereby the load required to prevent the rotation thereof can be dispersed to the first and second rotation preventors, and the load borne by the stator shaft can be reduced. This can suppress well the increase in the axial lengths of the first and second rotation preventive fittings, the diameters (the torque radii) of the first and second tubular portions of the support, the stator shaft and the connector, and the thickness of the stator shaft. Further, the first and second tubular portions that extend in the opposite directions individually function as a rib. Thus, by providing both the first and second tubular portions on the support, the strength of the support can be improved while suppressing the increase in thickness of the support. Consequently, in this power transmission system, the overall size of the power transmission system can be made compact while fixing the stator shaft of the torque converter and the stationary element of the planetary gear in place so as not to rotate.

DETAILED DESCRIPTION OF EMBODIMENTS

Next, referring to the drawings, an embodiment of the disclosure will be described.

Figure 1:
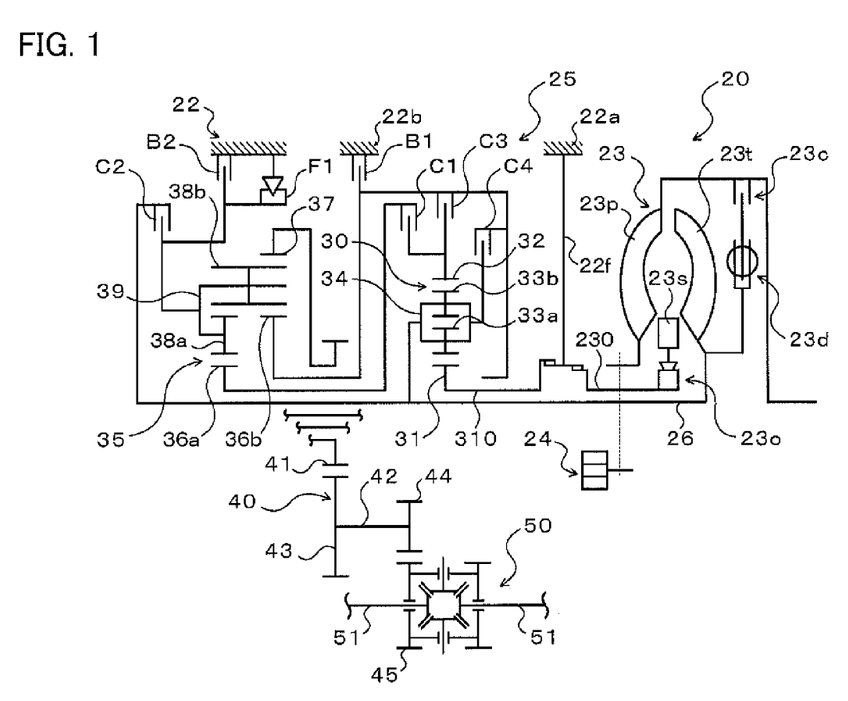
FIG. 1 is a schematic block diagram of a power transmission system of the disclosure.

FIG. 1 is a schematic block diagram of a power transmission system 20 of the disclosure. The power transmission system 20 shown in FIG. 1 is connected to a crankshaft of an engine, not shown, mounted in a front-wheel drive vehicle so as to deliver power from the engine to left and right drive wheels (front wheels). As shown in FIG. 1, the power transmission system 20 includes a transmission case 22, a torque converter (a starting system) 23, an oil pump 24, an automatic transmission 25 that is accommodated in the transmission case 22, a gear mechanism (a gear train) 40, and a differential gear (a differential mechanism) 50.

The transmission case 22 includes a converter housing 22a and a transaxle case 22b that is fastened (fixed) to the converter housing 22a. The transmission case 22 includes additionally a front support (a support member or support) 22f that is fastened (fixed) to the transaxle case 22b so as to be positioned between the converter housing 22a and the transaxle case 22b. In this embodiment, the converter housing 22a and the transaxle case 22b are formed of, for example, an aluminum alloy, and the front support 22f is formed of an aluminum alloy or iron.

The torque converter 23 has an input side pump impeller 23p that is connected to the crankshaft of the engine, an output side turbine runner 23t that is connected to an input shaft 26 of the automatic transmission 25, a stator 23s that is disposed inside the pump impeller 23p and the turbine runner 23t to rectify a flow of working oil from the turbine runner 23t to the pump impeller 23p, a one-way clutch 23o that limits the rotation of the stator 23s to one direction, a lock-up clutch 23c and a damper device 23d.

The oil pump 24 is configured as a gear pump that has a pump assembly including a pump body and a pump cover, an externally toothed gear (an inner rotor) that is coupled to the pump impeller 23p of the torque converter 23 via a chain or a gear train and an internally toothed gear (an outer rotor) that meshes with the externally toothed gear. The oil pump 24 is driven by means of power from the engine so as to suck working oil (ATF) reserved in an oil pan, not shown, and send it to a hydraulic pressure control device, not shown, under pressure.

The automatic transmission 25 is configured as an eight speed transmission and includes, as shown in FIG. 1, a double pinion type first planetary gear mechanism 30, a Ravigneaux type second planetary gear mechanism 35, four clutches C1, C2, C3 and C4 that change a power transmission path from an input side to an output side, two brakes B1 and B2 and a one-way clutch F1.

The first planetary gear mechanism 30 has a sun gear (a stationary element) 31 that is an externally toothed gear, a ring gear 32 that is an internally toothed gear disposed concentrically with the sun gear 31, and a planetary carrier 34 that holds a plurality of pinion gear sets each configured by two pinion gears 33a, 33b that mesh with each other, one of which meshes with the sun gear 31, and the other of which meshes with the ring gear 32, the plurality of pinion gear sets being held so that the pinion gears 33a, 33b not only rotate on their own axes (rotate freely) but also walk around the sun gear 31 and the ring gear 32. As shown in FIG. 1, the sun gear 31 of the first planetary gear mechanism 30 is connected (fixed) to the transmission case 22 via the front support 22f so as not to rotate, and the planetary carrier 34 of the first planetary gear mechanism 30 is connected to the input shaft 26 so as to rotate together therewith. The first planetary gear mechanism 30 is configured as a reduction gear and decelerates power delivered to the planetary carrier 34 that is an input element for output from the ring gear 32.

The second planetary gear mechanism 35 has a first sun gear 36a and a second sun gear 36b that are externally toothed gears, a ring gear 37 that is an internally toothed gear and which is disposed concentrically with the first and second sun gears 36a, 36b, a plurality of short pinion gears 38a that mesh with the first sun gear 36a, a plurality of long pinion gears 38b that mesh not only with the second sun gear 36b and the plurality of short pinion gears 38b but also with the ring gear 37, and a planetary carrier 39 that holds the plurality of short pinion gears 38a and the plurality of long pinion gears 38b so that the short and long pinion gears 38a, 38b not only rotate on their own axes (rotate freely) but also walk around the sun gears 36a, 36b and the ring gear 37. The ring gear 37 of the second planetary gear mechanism 35 functions as an output member of the automatic transmission 25, and power delivered to the ring gear 37 from the input shaft 26 is delivered to the left and right drive wheels via the gear mechanism 40, the differential gear 50 and drive shafts 51. The planetary carrier 39 is supported by the transmission case 22 via the one-way clutch F1, and the rotation of the planetary carrier 39 is limited to one direction by the one-way clutch F1.

The clutch C1 is a multi-plate friction hydraulic clutch that has a piston, pluralities of friction plates and separator plates, and a hydraulic servo configured by an oil chamber to which working oil is supplied and which can connect the ring gear 32 of the first planetary gear mechanism 30 with the first sun gear 36a of the second planetary gear mechanism 35 and release the connection of the ring gear 32 with the first sun gear 36a. The clutch C2 is a multi-plate friction hydraulic clutch that has a piston, pluralities of friction plates and separator plates, and a hydraulic servo configured by an oil chamber to which working oil is supplied and which can connect the input shaft 26 with the planetary carrier 39 of the second planetary gear mechanism 35 and release the connection of the input shaft 26 with the planetary carrier 39. The clutch C3 is a multi-plate friction hydraulic clutch that has a piston, pluralities of friction plates and separator plates, and a hydraulic servo configured by an oil chamber to which working oil is supplied and which can connect the ring gear 32 of the first planetary gear mechanism 30 with the second sun gear 36b of the second planetary gear mechanism 35 and release the connection of the ring gear 32 with the second sun gear 36b. The clutch C4 is a multi-plate friction hydraulic clutch that has a piston, pluralities of friction plates and separator plates, and a hydraulic servo configured by an oil chamber to which working oil is supplied and which can connect the planetary carrier 34 of the first planetary gear mechanism 30 with the second sun gear 36b of the second planetary gear mechanism 35 and release the connection of the planetary carrier 34 with the second sun gear 36b.

The brake B1 is a multi-plate friction hydraulic brake that has pluralities of friction plates and separator plates and a hydraulic servo configured by an oil chamber to which working oil is supplied and which can fix the second sun gear 36b of the second planetary gear mechanism 35 to the transmission case 22 so as not to rotate and release the fixing of the second sun gear 36b to the transmission case 22. The brake B2 is a multi-plate friction hydraulic brake that has pluralities of friction plates and separator plates and a hydraulic servo configured by an oil chamber to which working oil is supplied and which can fix the planetary carrier 39 of the second planetary gear mechanism 35 to the transmission case 22 so as not to rotate and release the fixing of the planetary carrier 39 to the transmission case 22.

The one-way clutch F1 includes an inner race that is connected (fixed) to the planetary carrier 39 of the second planetary gear mechanism 35, an outer race, a plurality of sprugs, a plurality of springs (leaf springs), and a cage. In this one-way clutch F1, when the outer race rotates in one direction relative to the inner race, torque is delivered via the sprugs, while when the outer race rotates in the other direction relative to the inner race, the outer race and the inner race rotate relative to each other. However, the one-way clutch F1 may employ a roller type one-way clutch in place of using the sprugs.

Figure 2:
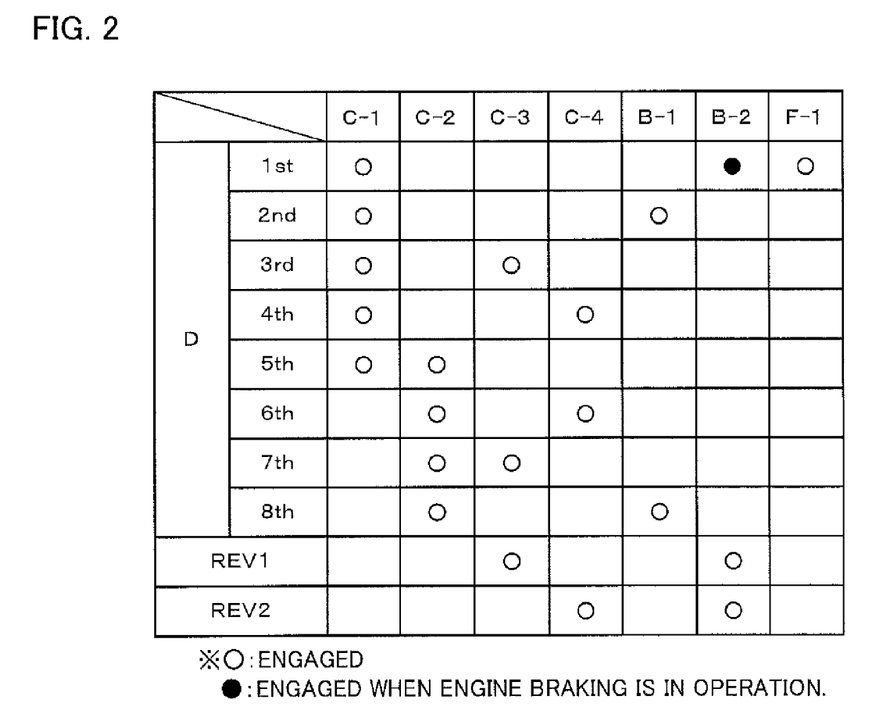
FIG. 2 is an operation chart showing related operating states between respective transmission shift stages and clutches and brakes of an automatic transmission that is included in the power transmission system shown in FIG. 1.

The clutches C1 to C4 and the brakes B1 and B2 operate based on the supply and discharge of working oil that are controlled by the hydraulic pressure control device, not shown. FIG. 2 shows an operation chart showing related operating states between respective transmission shift stages and the clutches C1 to C4, the brakes B1 and B2 and the one-way clutch F1 of the automatic transmission 25. The automatic transmission 25 provides eight forward transmission shift stages, a first to eighth gears, and two reverse transmission shift stages, a first and second gears, by putting the clutches C1 to C4 and the brakes B1 and B2 in the operating states shown in the operation chart in FIG. 2. At least any one of the clutches C1 to C4 and the brakes B1 and B2 may be a meshing engaging element such as a dog clutch.

The gear mechanism 40 has a counter-drive gear 41 that is connected to the ring gear 37 of the second planetary gear mechanism 35 of the automatic transmission 25, a counter-driven gear 43 that is fixed to a countershaft 42 that extends parallel to the input shaft 26 of the automatic transmission 25 and which meshes with the counter-drive gear 41, a drive pinion gear 44 that is formed on (or fixed to) the countershaft 42, and a differential ring gear 45 that meshes with the drive pinion gear 44 and which is connected to the differential gear 50.

Figure 3:
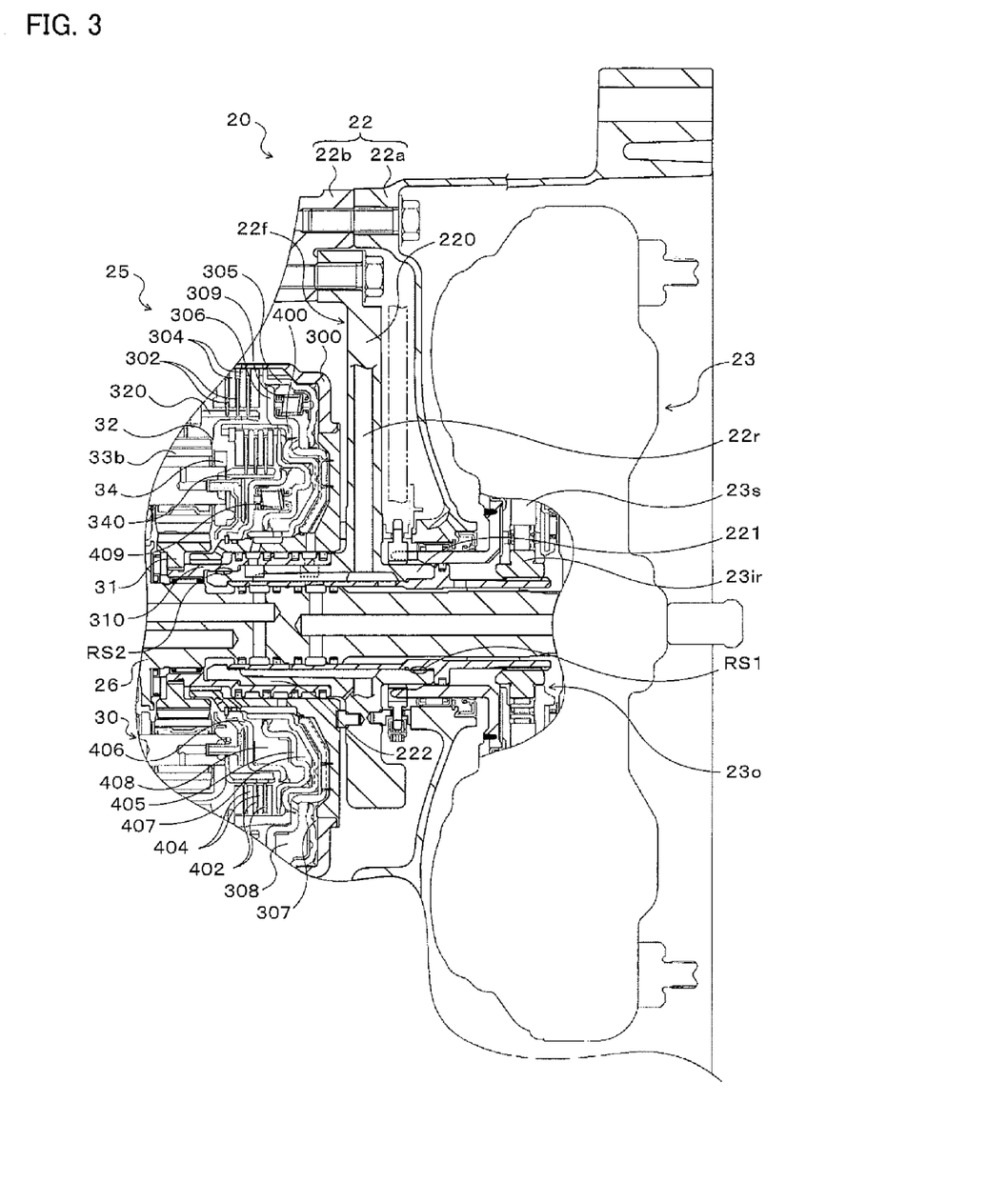
FIG. 3 is an enlarged sectional view showing the power transmission system of the disclosure.
Figure 4:
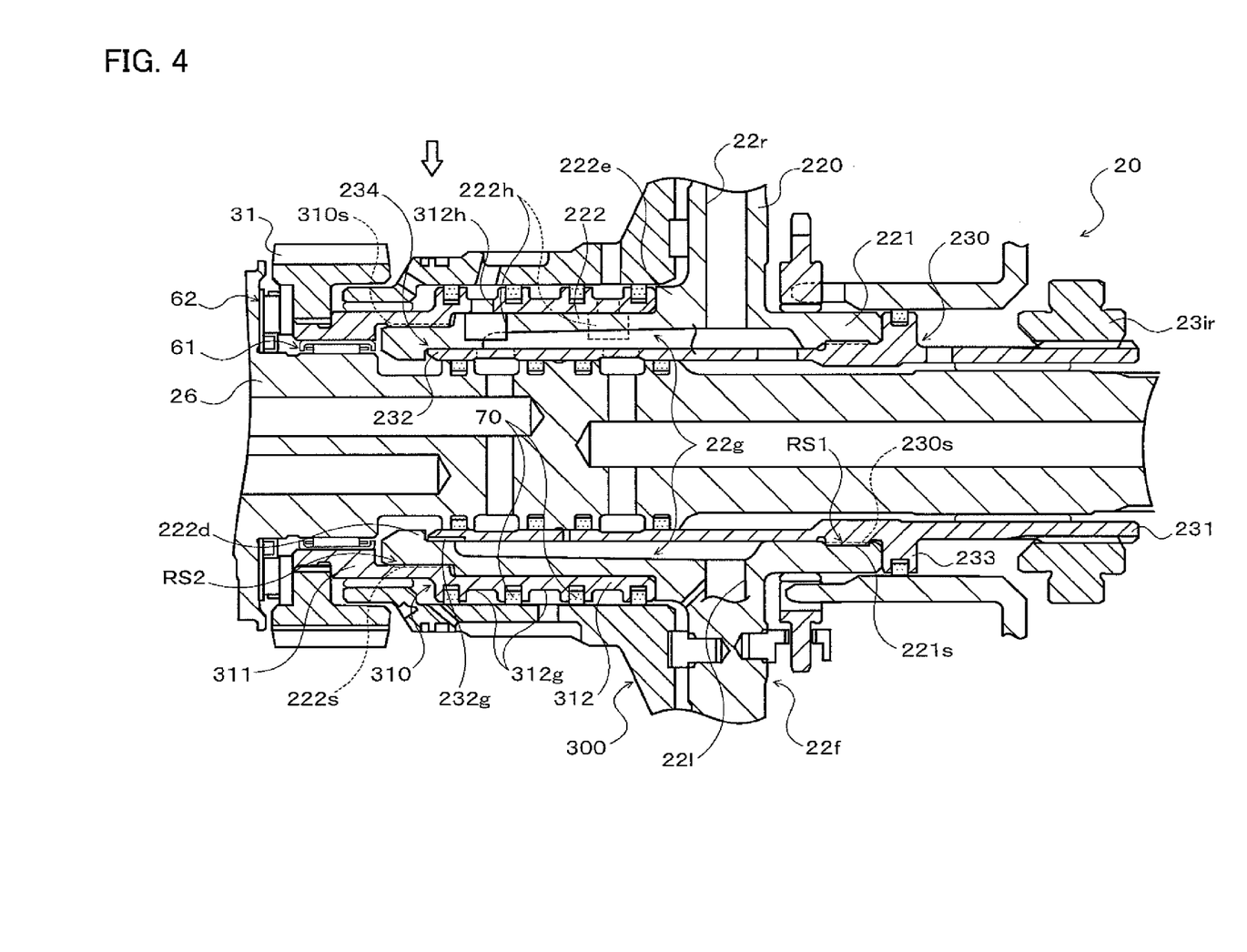
FIG. 4 is an enlarged sectional view of a main part showing the power transmission system of the disclosure.

Next, referring to FIGS. 3 and 4, a peripheral construction of the front support 22f of the power transmission system 20 will be described in detail. As shown in FIG. 3, the front support 22f that makes up part of the transmission case 22 has a wall portion 220 (wall) that is fastened (fixed) to the transaxle case 22b that makes up the transmission case 22 between the torque converter 23 and the automatic transmission 25, a first tubular portion 221 (tube) that extends in an axial direction from the wall portion 220 towards the torque converter 23, and a second tubular portion 222 (tube) that extends from the wall portion 220 towards the automatic transmission 25, that is, in an opposite axial direction to the axial direction in which the first tubular portion 221 extends.

A plurality of radial oil paths 22r are formed in the wall portion 220 of the front support 22f so as to extend individually in a radial direction, and working oil (hydraulic pressure) from the hydraulic pressure control device, not shown, is supplied to the radial oil paths 22r. A plurality of oil grooves 22g are formed circumferentially at intervals on an inner circumferential surface of the front support 22r (inner circumferential surfaces of the first and second tubular portions 221, 222 and the wall portion 220). The plurality of oil grooves 22g communicate individually with the corresponding radial oil paths 22r and extend in the axial direction without opening at free ends of the first and second tubular portions 221, 222. Further, a plurality of oil holes 22h are formed in the second tubular portion 222. The plurality of oil holes 22h communicate individually with the corresponding oil grooves 22g and open on an outer circumferential surface of the second tubular portion 222.

A stator shaft 230 is connected to the stator 23s of the torque converter 23 via the one-way clutch 23o as shown in the figure. The stator shaft 230 is connected (fixed) to the transmission case 22 via the front support 22f so as not to rotate. An end portion (a torque converter 23 side end portion) 231 of the stator shaft 230 is spline fitted in an inner race 23ir of the one-way clutch 23o as shown in FIG. 4. At least one short oil groove 232g is formed on an outer circumferential surface of the other end portion (an automatic transmission 25 side end portion) 232 of the stator shaft 230 so as to open at a free end of the end portion 232. Further, a collar portion 233 is formed on an outer circumferential surface of the stator shaft 230 so as to project radially outwards.

The stator shaft 230 is inserted into the first and second tubular portions 221, 222 so that an end face (a left end face in FIG. 4) of the collar portion 233 is brought into abutment with an end face of the first tubular portion 221 of the front support 22f. In this embodiment, an end portion 232 of the stator shaft 230 is press fitted in the second tubular portion 222 so that an end face of the end portion 232 is brought into abutment with a diametrically contracted portion 222d formed on an inner circumference of the second tubular portion 222 and that the oil groove 232g communicates with the corresponding oil groove 22g in the front support 22f. By adopting this configuration, the end portion 232, which faces the automatic transmission 25, of the stator shaft 230, that is, a portion of the end portion 232 where the oil groove 232g is not formed is press fitted in the second tubular portion 222 of the front support 22f to thereby seal up an automatic transmission 25 side end portion of at least one of the oil grooves 22g formed in the front support 22f.

A serration 221s is formed on an inner circumferential surface of the free end portion (a right end in FIG. 3) of the first tubular portion 221 of the front support 22f, and a serration 230s is formed on part of the outer circumferential surface of the stator shaft 230, that is, the outer circumferential surface of a portion of the stator shaft 230 that lies close to the collar portion 233 on an end portion 232 side so as to mesh with the serration 221s formed on the inner circumferential surface of the free end portion of the first tubular portion 221. By adopting this configuration, when the stator shaft 230 is inserted into the first and second tubular portions 221, 222, the serration 221s of the first tubular portion 221 meshes with the serration 230s of the stator shaft 230 to thereby make up a first rotation preventive fitting portion RS1 (first rotation preventive fitting), whereby the stator shaft 230 is connected to the front support 22f, that is, the transmission case 22 so as not to rotate.

Further, as shown in FIG. 3, the clutches C3 and C4 of the automatic transmission 25 are disposed near the front support 22f. The clutch C3 that connects the ring gear 32 of the first planetary gear mechanism 30 with the second sun gear 36b of the second planetary gear mechanism 35 has a clutch hub 320 that is integrated with (connected to) the ring gear 32, a clutch drum 300 that is connected to the second sun gear 36b of the second planetary gear mechanism 35, a plurality of friction plates (friction engaging plates) 302 that are spline fitted on the clutch hub 320 at inner circumferential portions thereof, a plurality of separator plates (friction engaging plates) 304 which are spline fitted in the clutch drum 300 at outer circumferential portions thereof, a piston 305 that presses the friction plates 302 and the separator plates 304 so as to bring them into frictional engagement with each other, and a cancellation plate (a cancellation oil chamber defining member) 306 that is fixed to the clutch drum 300.

The clutch drum 300 has an inner tube portion, an annular side wall portion that extends radially outwards from an end (a right end in FIG. 3) of the inner tube portion and an outer tube portion that extends in an axial direction and in the same direction as the direction in which the inner tube portion extends from an outer circumferential end of the side wall portion and in which the separator plates 304 are spline fitted. The friction plates 302 that are spline fitted on the clutch hub 320 are annular members to both surfaces of which a friction material is securely affixed, and the separator plates 304 that are spline fitted in the clutch drum 300 are annular members both surfaces of which are formed smooth. The cancellation plate 306 has an annular inner circumferential portion, an axially extending portion that extends in the axial direction from an outer circumferential end of the inner circumferential portion, and an annular outer circumferential portion that extends outwards from a distal end of the axially extending portion. The inner circumferential portion of the cancellation plate 306 is fixed to an inner surface of the side wall portion of the clutch drum 300 in such a way that the outer circumferential portion of the cancellation plate 306 lies opposite to an outer circumferential portion of the side wall portion of the clutch drum 300.

The piston 305 is fitted on the axially extending portion of the cancellation plate 306. The piston 305 defines an engaging oil chamber 307 together with the clutch drum 300 and defines together with the outer circumferential portion of the cancellation plate 306 a cancellation oil chamber 308 that cancels a centrifugal oil pressure generated in the engaging oil chamber 307. A plurality of return springs 309 are disposed in the cancellation oil chamber 308, that is, between the piston 305 and the cancellation plate 306. The return springs 309 bias the piston 305 so as to be spaced apart from the friction plates 302 and the separator plates 304.

The clutch C4 that connects the planetary carrier 34 of the first planetary gear mechanism 30 with the second sun gear 36b of the second planetary gear mechanism 35 has a clutch hub 340 that is integrated with (connected to) the planetary carrier 34, a clutch drum 400 that is connected to the second sun gear 36b of the second planetary gear mechanism 35 via the clutch drum 300, a plurality of friction plates (friction engaging plates) 402 that are spline fitted on the clutch hub 340 at inner circumferential portions thereof, a plurality of separator plates (friction engaging plates) 404 that are spline fitted in the clutch drum 400 at outer circumferential portions thereof, a piston 405 that presses the friction plates 402 and the separator plates 404 so as to bring them into frictional engagement with each other, and a cancellation plate (a cancellation oil chamber defining member) 406 that is fixed to the clutch drum 300.

The clutch drum 400 has an inner tube portion that is fixed to the inner tube portion of the clutch drum 300, an annular side wall portion that extends radially outwards from an end (a right end in FIG. 3) of the inner tube portion and which is fixed to the side wall portion of the clutch drum 300 and an outer tube portion that extends in the axial direction and in the same direction as the direction in which the inner tube portion extends from an outer circumferential end of the side wall portion and in which the separator plates 404 are spline fitted. The friction plates 402 that are spline fitted on the clutch hub 340 are annular members to both surfaces of which a friction material is securely affixed, and the separator plates 404 that are spline fitted in the clutch drum 400 are annular members both surfaces of which are formed smooth.

The piston 405 is fitted on the inner tube portion of the clutch drum 400, and the piston 405 defines an engaging oil chamber 407 together with the clutch drum 400. The cancellation plate 406 is fitted in the inner tube portion of the clutch drum 300 and defines together with the piston 405 a cancellation oil chamber 408 that cancels a centrifugal oil pressure generated in the engaging oil chamber 407. A snap ring is mounted on the inner tube portion of the clutch drum 400 so as to restrict the axial movement of the cancellation plate 406. Further, a plurality of return springs 409 are disposed in the cancellation oil chamber 408, that is, between the piston 405 and the cancellation plate 406. The return springs 409 bias the piston 405 so as to be spaced apart from the friction plates 402 and the separator plates 404.

The clutch drum 300 of the clutch C3 is supported rotatably by the front support 22f that makes up part of the transmission case 22 via a tubular connecting sleeve (a connecting member or connector) 310 that connects the front support 22f with the sun gear 31 of the first planetary gear mechanism 30 and a bush and is disposed so as to approach the front support 22f. The connecting sleeve 310 has, as shown in FIG. 4, a small-diameter portion 311 that is spline fitted in (fixed to) an inner circumferential portion of the sun gear 31 and a large-diameter portion 312 that is extended from an end portion of the small-diameter portion 311 which lies opposite to the sun gear 31 and which is greater in diameter than that of the small-diameter portion 311.

As shown in the figure, the connecting sleeve 310 is fitted (press fitted) on the second tubular portion 222 so that an end face of the large-diameter portion 312 is brought into abutment with an end face of a diametrically expanded portion 222e that is formed on the second tubular portion 222 of the front support 22f so as to lie closer to the automatic transmission 25 than the wall portion 220. Namely, the second tubular portion 222 is press fitted in the large-diameter portion 312 of the connecting sleeve 310. Then, a serration 222s is formed on part of the outer circumferential surface of the second tubular portion 222 of the front support 22f, that is, the outer circumferential surface of the free end of the second tubular portion 222, and a serration 310s is formed on an inner circumferential surface of the small-diameter portion 311 of the connecting sleeve 310 so as to mesh with the serration 222s that is formed on the inner circumferential surface of the free end portion of the second tubular portion 222.

By adopting this configuration, when the connecting sleeve 310 is fitted on the second tubular portion 222 of the front support 22f, the serration 222s of the second tubular portion 222 meshes with the serration 310s of the connecting sleeve 310 to thereby make up a second rotation preventive fitting portion RS2 (second rotation preventive fitting), whereby the connecting sleeve 310 and the sun gear 31, which is the stationary element, of the first planetary gear mechanism 30 are connected to the front support 22f, that is, the transmission case 22 so as not to rotate. In this embodiment, the second rotation preventive fitting portion RS2 overlaps a seal portion 234 that is formed by the automatic transmission 25 side end portion 232 of the stator shaft 230, that is, the portion of the end portion 232 where the oil groove 232g is not formed and the second tubular portion 222 when seen from a radial direction (a direction indicated by a white arrow in FIG. 4) of the automatic transmission 25.

Further, the small-diameter portion 311 of the connecting sleeve 310 that is connected to the front support 22f so as not to rotate supports the input shaft 26 of the automatic transmission 25 rotatably via a radial bearing 61, and a thrust bearing 62 is disposed between a collar portion that is formed on the input shaft 26 and the sun gear 31 or the connecting sleeve 310. A plurality of annular oil grooves 312g are formed axially at intervals on an outer circumferential surface of the large-diameter portion 312 of the connecting sleeve 310, and seal members 70 such as O-rings are disposed on both sides of the individual oil grooves 312g and between the large-diameter portion 312 and the inner tube portion of the clutch drum 300. Further, a plurality of oil holes 312h are formed in the large-diameter portion 312 of the connecting sleeve 310. The plurality of oil holes 312h communicate with the corresponding oil grooves 312g and communicate with corresponding oil holes 222h in the second tubular portion 222 on an inner circumferential surface side of the large-diameter portion 312.

Then, working oil from the hydraulic pressure control device, not shown, is supplied to the engaging oil chamber 307 and the cancellation oil chamber 308 of the clutch C3 and the engaging oil chamber 407 and the cancellation oil chamber 408 of the clutch C4 via the radial oil paths 22r in the front support 22f, the oil grooves 22g and the oil holes 22h, the oil holes 312h and the oil grooves 312g of the connecting sleeve 310 and the oil holes and the oil paths that are formed in the inner tube portion of the clutch drum 300 and between the clutch drum 300 and the clutch drum 400. Working oil that is supplied from the hydraulic pressure control device to any of the oil grooves 22g in the front support 22f is supplied to the radial bearing 61 and the thrust bearing 62 as a lubricating and cooling medium via the oil groove 232g formed in the end portion 232 of the stator shaft 230.

As has been described above, the power transmission system 20 includes the wall portion 220 that is fixed to the transmission case 22 between the torque converter 23 and the automatic transmission 25 and the front support 22f having the first tubular portion 221 that extends in the axial direction towards the torque converter 23 from the wall portion 220 and the second tubular portion 222 that extends in the axial direction towards the automatic transmission 25 from the wall portion 220. The stator shaft 230 that is connected to the stator 23s of the torque converter 23 via the one-way clutch 23o is connected to the first tubular portion 221 of the front support 22f via the first rotation preventive fitting portion RS1 so as not to rotate. Further, the one end of the connecting sleeve 310 that connects the front support 22f and the sun gear 31 of the first planetary gear mechanism 30 together is fixed to the sun gear 31, which is the stationary element, of the first planetary gear mechanism 30, and the other end thereof is connected to the second tubular portion 222 of the front support 22f via the second rotation preventive fitting portion RS2 so as not to rotate.

In this way, the rotation preventive fitting portions RS1, RS2 are provided individually for both the stator shaft 230 and the sun gear 31 of the first planetary gear mechanism 30 so that the stator shaft 230 and the sun gear 31 of the first planetary gear mechanism 30 are fixed to the transmission case 22 so as not to rotate via the front support 22f, whereby the load required to prevent the rotation thereof can be dispersed to the first and second rotation preventive portions RS1, RS2 and the load borne by the stator shaft 230 can be reduced. This can suppress well the increase in the axial lengths of the first and second rotation preventive fitting portions RS1, RS2, the diameters (the torque radii) of the first and second tubular portions 221, 222 of the front support 22f, the stator shaft 230 and the connecting sleeve 310, and the thickness of the stator shaft 230. Further, the first and second tubular portions 221, 222 of the front support 22f that extend in the opposite directions to each other also function as the ribs. Thus, the strength of the front support 22f can be improved while suppressing the increase in thickness thereof by providing both the tubular portions on the front support 22f. Consequently, in this power transmission system 20, the overall size of the power transmission system 20 can be made compact while fixing the stator shaft 230 of the torque converter 23 and the sun gear 31 of the first planetary gear mechanism 30 in place so as not to rotate.

The first rotation preventive fitting portion RS1 that includes the serrations 230s and 221s is provided between the outer circumferential surface of the stator shaft 230 and the inner circumferential surface of the first tubular portion 221, and the automatic transmission 25 side end portion 232 of the stator shaft 230 is press fitted in the second tubular portion 222, whereby the stator shaft 230 can be fixed to the front support 22f more strongly and rigidly while suppressing the increase in axial length of the first rotation preventive fitting portion RS1. In addition, the second rotation preventive fitting portion RS2 that includes the serrations 310s and 222s is provided between the inner circumferential surface of the connecting sleeve 310 and the outer circumferential surface of the second tubular portion 222 to thereby increase the torque radius of the second rotation preventive fitting portion RS, whereby the sun gear 31 of the first planetary gear mechanism 30 can be fixed in place so as not to rotate in a better fashion while suppressing well the increase in axial length of the second rotation preventive fitting portion RS2 and hence power transmission system 20. Further, the second rotation preventive fitting portion RS2 and the seal portion 234 that is formed by the automatic transmission 25 side end portion 232 of the stator shaft 230 and the second tubular portion 222 are disposed so as to overlap each other when seen from the radial direction of the automatic transmission 25, whereby the good layout of the oil paths in the power transmission system 20 can be ensured while suppressing better the increase in axial length of the power transmission system 20.

Then, as done in the embodiment that has been described heretofore, in case the first and second rotation preventive fitting portions RS1, RS2 are configured by the serrations 221s, 222s, 230s, 310s that correspond to splines having a function to prevent the dislocation of the stator shaft 230 and the connecting sleeve 310, the stator shaft 230 and the connecting sleeve 310 can be connected (fixed) to the front support 22f more strongly and rigidly. In the embodiment, however, the end portion 232 of the stator shaft 230 is press fitted in the second tubular portion 222 of the front support 22f and the second tubular portion 222 is press fitted in the large-diameter portion 312 of the connecting sleeve 310. Thus, the first and second rotation preventive fitting portions RS1, RS2 may be configured by splines by replacing the serrations 221s, 222s, 230s, 310s with splines.

Thus, as has been described heretofore, the power transmission system according to the disclosure includes the torque converter, the transmission having the planetary gear and the case configured to accommodate the torque converter and the transmission. The power transmission system includes: the support member having the wall portion that is fixed to the case between the torque converter and the transmission and the tubular portion that extends in the axial direction from the inner circumferential portion of the wall portion; the stator shaft that is connected to the stator of the torque converter via the one-way clutch; and the tubular connecting member that connects the support member and the stationary element of the planetary gear together, in which the stator shaft is connected to the end portion, lying to face the torque converter, of the tubular portion of the support member via the first rotation preventive fitting portion so as not to rotate, and the connecting member is connected to the end portion, lying to face the transmission, of the tubular portion of the support member via the second rotation preventive fitting portion so as not to rotate.

The power transmission system includes the support member having the wall portion that is fixed to the case between the torque converter and the transmission and the tubular portion that extends in the axial direction from the inner circumferential portion of the wall portion. The stator shaft is connected to the stator of the torque converter via the one-way clutch, and the support member and the stationary element of the planetary gear are connected to each other via the tubular connecting member. The stator shaft is connected to the torque converter side end portion of the tubular portion of the support member via the first rotation preventive fitting portion so as not to rotate, and the connecting member is connected to the transmission side end portion of the tubular portion of the support member via the second rotation preventive fitting portion so as not to rotate. In this way, the rotation preventive fitting portions are provided individually for both the stator shaft and the stationary element of the planetary gear so that the stator shaft and the stationary element of the planetary gear are fixed to the case so as not to rotate via the support member, whereby the load required to prevent the rotation thereof can be dispersed to the first and second rotation preventive portions, and the load borne by the stator shaft can be reduced. Adopting this configuration can suppress well the increase in axial length of each of the first and second rotation preventive fitting portions, in diameter (torque radius) of the tubular portion of the support member, the stator shaft and the connecting member and in thickness of the stator shaft. Consequently, in this power transmission system, the overall size of the power transmission system can be made compact while fixing the stator shaft of the torque converter and the stationary element of the planetary gear in place so as not to rotate.

The tubular portion may include the first tubular portion that extends in the axial direction from the wall portion towards the torque converter and the second tubular portion that extends in the axial direction from the wall portion towards the transmission, the stator shaft may be connected to the first tubular portion of the support member via the first rotation preventive fitting portion so as not to rotate, and the connecting member may be connected to the second tubular portion of the support member via the second rotation preventive fitting portion so as not to rotate. By adopting this configuration, the first and second tubular portions of the support member that extend in the opposite directions individually function as the rib. Thus, by providing both the first and second tubular portions on the support member, the strength of the support member can be improved while suppressing the increase in thickness of the support member.

Further, splines may be formed on the inner circumferential surface of the first tubular portion and the outer circumferential surface of the second tubular portion, the stator shaft may be inserted into the first and second tubular portions so that the end portion of the stator shaft that lies to face the transmission is press fitted in the second tubular portion, a spline may be formed on part of the outer circumferential surface of the stator shaft so as to mesh with the spline formed on the inner circumferential surface of the first tubular portion, the connecting member may be fitted in the second tubular portion, and a spline may be formed on part of the inner circumferential surface of the connecting member so as to mesh with the spline formed on the outer circumferential surface of the second tubular portion. In this way, the first rotation preventive fitting portion including the splines is provided between the outer circumferential surface of the stator shaft and the inner circumferential surface of the first tubular portion, and the end portion of the stator shaft that lies to face the transmission is press fitted in the second tubular portion, whereby the stator shaft can be fixed more strongly and rigidly to the support member while suppressing the increase in axial length of the first rotation preventive fitting portion. In addition, the second rotation preventive fitting portion including the splines is provided between the inner circumferential surface of the connecting member and the outer circumferential surface of the second tubular portion to thereby increase the torque radius of the second rotation preventive fitting portion, whereby the stationary element of the planetary gear can be fixed in place so as not to rotate in a better fashion while suppressing the increase in axial length of the second rotation preventive fitting portion. Consequently, according to this configuration, it is possible to suppress well the increase in axial length of the power transmission system.

In addition, the plurality of oil grooves extending in the axial direction may be formed at intervals in the circumferential direction on the inner circumferential surface of the tubular portion of the support member, the end portion of the stator shaft that lies to face the transmission may be press fitted in the tubular portion so as to seal up the end portion, lying to face the transmission, of at least one of the oil grooves, and the second rotation preventive fitting portion may overlap the seal portion that is formed by the end portion, lying to face the transmission, of the stator shaft and the tubular portion when seen from the radial direction of the transmission. In this way, the second rotation preventive fitting portion and the seal portion that is formed by the transmission side end portion of the stator shaft and the tubular portion are disposed so as to overlap each other when seen from the radial direction of the transmission, whereby the good layout of the oil paths in the power transmission system can be ensured while suppressing better the increase in axial length of the power transmission system.

Then, the disclosure is not limited to the embodiment that has been described heretofore in any way. It goes without saying that the disclosure can be modified variously without departing from the spirit and scope of the disclosure. Further, the mode for carrying out the disclosure that has been described heretofore represents only the specific form of the disclosure that is described in the section of the summary of the disclosure and is not intended to limit the factors of the disclosure that are described in the section of the summary of the disclosure.

INDUSTRIAL APPLICABILITY

The disclosure can be made use of in the manufacturing industry of power transmission systems.

The invention claimed is:
1. A power transmission system comprising:
a torque converter;
a transmission having a planetary gear;
a case configured to accommodate the torque converter and the transmission;
a support having a wall that is fixed to the case between the torque converter and the transmission and a tube that extends in an axial direction from an inner circumferential portion of the wall;
a stator shaft that is connected to a stator of the torque converter via a one-way clutch; and
a tubular connector that connects the support and a stationary element of the planetary gear together,
wherein the stator shaft is connected to an end portion, lying to face the torque converter, of the tube of the support via a first rotation preventive fitting so as not to rotate, and the connector is connected to an end portion, lying to face the transmission, of the tube of the support via a second rotation preventive fitting so as not to rotate.

2. The power transmission system according to claim 1, wherein the tube includes a first tubular portion that extends in an axial direction from the wall towards the torque converter and a second tubular portion that extends in the axial direction from the wall towards the transmission, the stator shaft is connected to the first tubular portion of the support via the first rotation preventive fitting so as not to rotate, and the connector is connected to the second tubular portion of the support via the second rotation preventive fitting so as not to rotate.

3. The power transmission system according to claim 2, wherein splines are formed on an inner circumferential surface of the first tubular portion and an outer circumferential surface of the second tubular portion, the stator shaft is inserted into the first and second tubular portions so that an end portion of the stator shaft that lies to face the transmission is press fitted in the second tubular portion, a spline is formed on part of an outer circumferential surface of the stator shaft so as to mesh with the spline formed on the inner circumferential surface of the first tubular portion, the connector is fitted in the second tubular portion, and a spline is formed on part of an inner circumferential surface of the connector so as to mesh with the spline formed on the outer circumferential surface of the second tubular portion.

4. The power transmission system according to claim 3, wherein a plurality of oil grooves extending in the axial direction are formed at intervals in a circumferential direction on an inner circumferential surface of the support, the end portion of the stator shaft that lies to face the transmission is press fitted in the tube so as to seal up an end portion, lying to face the transmission, of at least one of the oil grooves, and the second rotation preventive fitting overlaps a seal portion that is formed by the end portion, lying to face the transmission, of the stator shaft and the tube when seen from a radial direction of the transmission.

5. The power transmission system according to claim 2, wherein a plurality of oil grooves extending in the axial direction are formed at intervals in a circumferential direction on an inner circumferential surface of the support, the end portion of the stator shaft that lies to face the transmission is press fitted in the tube so as to seal up an end portion, lying to face the transmission, of at least one of the oil grooves, and the second rotation preventive fitting overlaps a seal portion that is formed by the end portion, lying to face the transmission, of the stator shaft and the tube when seen from a radial direction of the transmission.

6. The power transmission system according to claim 1, wherein a plurality of oil grooves extending in the axial direction are formed at intervals in a circumferential direction on an inner circumferential surface of the support, the end portion of the stator shaft that lies to face the transmission is press fitted in the tube so as to seal up an end portion, lying to face the transmission, of at least one of the oil grooves, and the second rotation preventive fitting overlaps a seal portion that is formed by the end portion, lying to face the transmission, of the stator shaft and the tube when seen from a radial direction of the transmission.

* * * * *